US011423619B2

(12) United States Patent
Tan et al.

(10) Patent No.: US 11,423,619 B2
(45) Date of Patent: Aug. 23, 2022

(54) SYSTEM AND METHOD FOR A VIRTUAL SHOWROOM

(71) Applicant: Volvo Car Corporation, Gothenburg (SE)

(72) Inventors: Qinzi Tan, San Jose, CA (US); Lukasz Pasek, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/829,132

(22) Filed: Mar. 25, 2020

(65) Prior Publication Data
US 2021/0304500 A1 Sep. 30, 2021

(51) Int. Cl.
*G06T 19/00* (2011.01)
*G06Q 30/06* (2012.01)

(52) U.S. Cl.
CPC ....... *G06T 19/003* (2013.01); *G06Q 30/0643* (2013.01)

(58) Field of Classification Search
CPC .......................... G06T 19/003; G06Q 30/0643
See application file for complete search history.

(56) References Cited

U.S. PATENT DOCUMENTS

| | | | |
|---|---|---|---|
| 9,412,203 B1* | 8/2016 | Garcia, III | G06T 11/60 |
| 10,203,762 B2 | 2/2019 | Bradski et al. | |
| 10,535,201 B1* | 1/2020 | Price | G06T 19/006 |
| 10,685,395 B1* | 6/2020 | Hecht | G07F 9/0235 |
| 2003/0046179 A1 | 3/2003 | Anabtawi et al. | |
| 2005/0277455 A1* | 12/2005 | Chudley | A63F 13/803 |
| | | | 463/6 |
| 2014/0152806 A1 | 6/2014 | Hauk | |
| 2016/0253745 A1 | 9/2016 | Lee | |
| 2017/0337573 A1* | 11/2017 | Toprak | G07C 5/006 |
| 2020/0066030 A1* | 2/2020 | Naik | G06T 7/90 |

* cited by examiner

*Primary Examiner* — Chong Wu
(74) *Attorney, Agent, or Firm* — Clements Bernard Walker; Christopher L. Bernard

(57) ABSTRACT

Systems and methods for virtual showroom are described. The virtual showroom may allow a consumer to virtually visit a showroom and receive detailed vehicle information in a variety of manners. A consumer may use augmented reality to highlight a vehicle and receive information regarding it. A consumer may walk through a guided showroom tour or walk through an interactive showroom tour. Another user may be conferenced into the tour as well.

20 Claims, 14 Drawing Sheets

| Vehicle Information 400 ||
|---|---|
| Interior 410 | Exterior 405 |
| Color | Color |
| Trim | Trim |
| Audio | Safety |
| Safety | Wheel |
| Seating | Headlight |
| Environment | Signal Light |
| Air Bag | Turning Capacity |
| Blind Spot Detection | Transmission |
| Lane Departure | Horsepower |
| | Mileage |
| | Sudden Stop |
| | Hood |
| | Safety Cage |

Fig. 4

| 1305 | Code to select a mode |
| --- | --- |
| 1310 | Code to transmit the selected mode |
| 1315 | Code to receive a mode selected |
| 1320 | Code to transmit showroom images |
| 1325 | Code to display showroom images |
| 1330 | Code to determine a vehicle selected |
| 1335 | Code to transmit the vehicle selection |
| 1340 | Code to receive a vehicle selection |
| 1345 | Code to transmit vehicle information |
| 1350 | Code to display the vehicle information |

Fig. 13

SYSTEM AND METHOD FOR A VIRTUAL SHOWROOM

TECHNICAL FIELD

The present disclosure relates generally to the automotive industry. More specifically, the present disclosure relates to a virtual showroom used in the vehicle sales industry and the like.

BACKGROUND

Currently, the consumer showroom experience is limited to places designed for such experiences. For example, if a consumer wants to see details of a vehicle that they are interested in, they typically have to physically visit a dealer showroom or vehicle exhibition. The experience usually requires the expertise of a person (i.e. salesperson or showroom specialist) to guide the consumer through vehicle features. Although some photos and videos may be available from dealers online, they may be limited and may not portray the overall consumer showroom experience. A consumer may not have time or want to travel to a dealership showroom. Consumer partners may have to both be present when shopping for a vehicle, which may be difficult to schedule. The person who is guiding the consumer may not have all the relevant knowledge or expertise as well, or they may simply forget to mention an option or feature. Some solutions have been for dealership staff to place multiple large text stickers on vehicles, for example. The stickers may be numerous and distracting. The stickers may prevent the consumer from appreciating the vehicle as a whole. For example, the consumer may not be able to see the overall vehicle design as a whole, because stickers are disrupting the view/s or experience. Therefore, there is a need for virtual showroom that solves these problems, to allow consumers the freedom and flexibility to shop or research vehicles without having to be physically present at a showroom, or be actually seated with a given model. Even in the showroom, better methods are needed for conveying information regarding and demonstrating vehicle features and functions.

SUMMARY

A system and method are described for a virtual showroom. The virtual showroom may allow a consumer to virtually visit a showroom and receive detailed vehicle information in a variety of manners.

In an embodiment, a computer implemented method for virtual showroom is described, including: receiving a virtual showroom mode indication; transmitting at least one virtual showroom image based on the received virtual showroom mode indication; receiving an indication of a determined vehicle; and transmitting vehicle information based on the indication of the determined vehicle. The method may utilize all three modes, only one mode, two of the modes, or any combinations thereof. A user may be able to switch between the modes. A user may be able to conference in another user. If a consumer cannot find a model to use for the augmented reality mode, they may be able to select a 3D model of one to view instead. Customization of views, including views that may not be physically possible at a real showroom, may be used. A consumer may also customize the type and format of information and models they wish to view. Vehicle information is broad and may include text, video, annotation, photo, composites, or any combinations thereof.

In an embodiment, a system for virtual showroom is described, including: a server, the server comprising at least one processor and a memory, the memory coupled to the at least one processor, the server capable of communicating with a user device, the memory comprising stored instructions which when executed by the at least one processor perform: receiving from the user device a virtual showroom mode; transmitting to the user device at least one virtual showroom image based on the received virtual showroom mode; receiving from the user device a vehicle identification; and transmitting to the user device vehicle information based on the vehicle identification. If a consumer cannot find a model to use for the augmented reality mode, they may be able to select a 3D model of one to view instead. Customization of views, including views that may not be physically possible at a real showroom, may be used. A consumer may also customize the type and format of information and models they wish to view. Vehicle information is broad and may include text, video, annotation, photo, composites, or any combinations thereof. A virtual showroom image may include a tour of a predetermined sequence images.

In an embodiment, a non-transitory computer readable medium encoded with processing instructions, for virtual showroom is described, including: code to receive a showroom mode; code to transmit showroom images based on the received showroom mode; code to receive a vehicle selection; and code to transmit vehicle information based on the received vehicle selection. A mode indicated may be a real image showroom, generated showroom, or augmented reality mode. Vehicle information is broad and may include text, video, annotation, photo, composites, or any combinations thereof. If a consumer cannot find a model to use for the augmented reality mode, they may be able to select a 3D model of one to view instead. Customization of views, including views that may not be physically possible at a real showroom, may be used. A consumer may also customize the type and format of information and models they wish to view. A user may be able to conference in another user. A virtual showroom image may be a tour of predetermined sequence images or an interactive predetermined sequence of images.

The disclosed embodiments may also be implemented as a software application running on the local dealership severs and/or user devices. The application may be a native, hybrid, or web application. The application or SAAS may be an on-premise software application. The application may provide a user device with a complementary application. The disclosed embodiments may be able to work with and be implemented on a multiplicity of well-known platforms.

BRIEF DESCRIPTION OF THE DRAWINGS

The following embodiments may be better understood by referring to the following figures. The figures are presented for illustration purposes only, and may not be drawn to scale or show every feature, orientation, or detail of the embodiments. They are simplified to help one of skill in the art understand the embodiments readily, and should not be considered limiting.

FIG. 4. illustrates vehicle information provided in an embodiment;

FIG. 13. illustrates code for virtual showroom in an embodiment.

DESCRIPTION OF EXEMPLARY EMBODIMENTS

Each of the additional features and teachings disclosed below can be utilized separately or in conjunction with other features and teachings to provide a system and method for virtual showroom. Representative examples of the following embodiments will now be described in further detail with reference to the attached drawings. This detailed description is merely intended to teach a person of skill in the art details for practicing the preferred aspects of the teachings and is not intended to limit the scope of the embodiments. In the present disclosure, many features are described as being optional, e.g. through the use of the verb "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features. The disclosed embodiments broadly describe systems and methods for a virtual showroom that may use real images, generated images, and augmented reality functions and/or features. The embodiments may provide consumers with an enhanced virtual experience.

Figure 1:
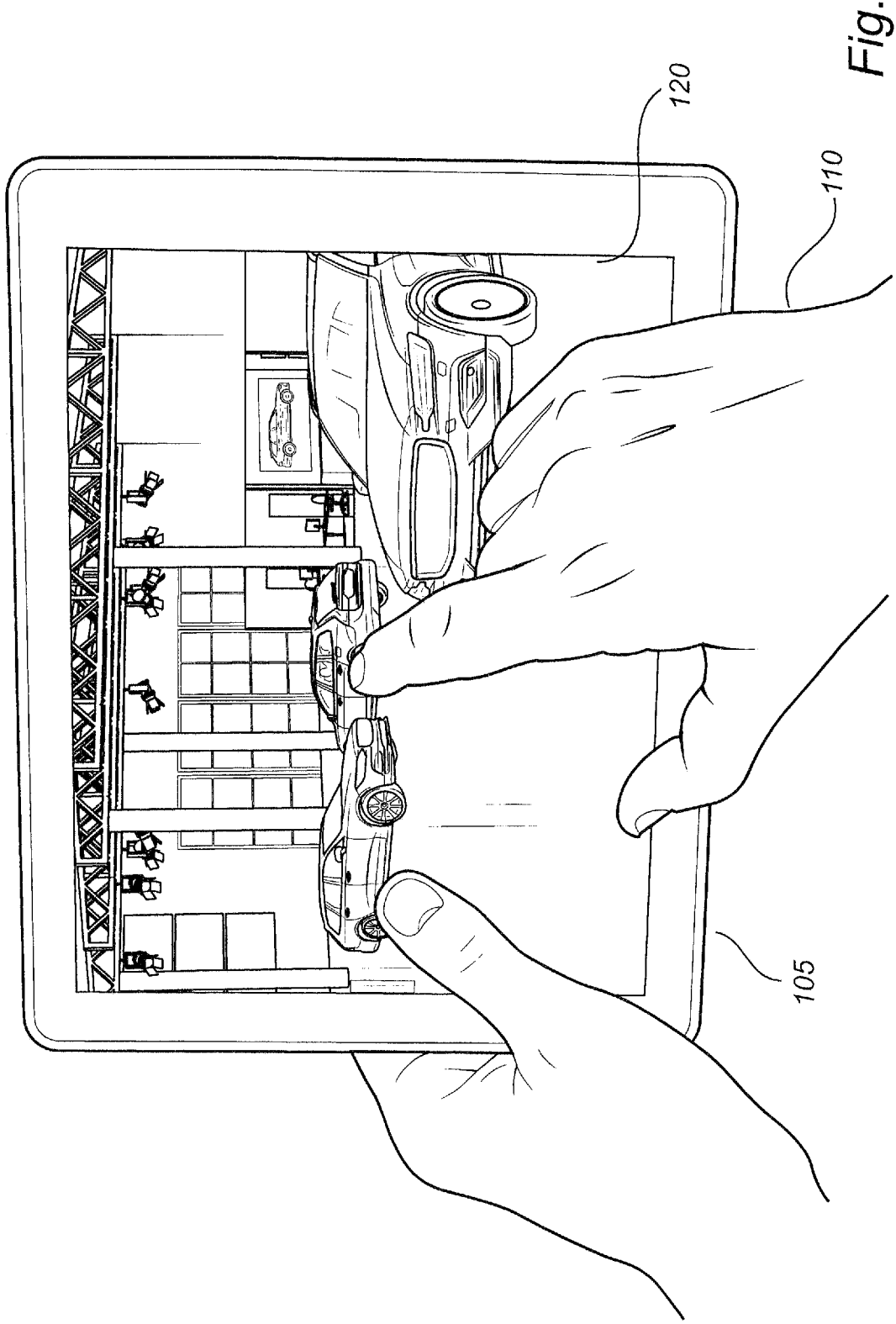
FIG. 1. illustrates a view of a virtual showroom application displayed on a user device in an embodiment.

FIG. 1 illustrates a view of a virtual showroom application 100 displayed on a user device in an embodiment. User 110 is shown holding a tablet 105. However, a user device may be any mobile computing device or computing device (e.g. laptop, smart phone, iPad, PC, etc.). In an embodiment, the display may be a virtual reality (VR) headset. User 110 may be viewing a virtual showroom image 120 displayed on the screen (or monitor, LCD display, VR headset, etc.). The showroom may be a complete or partial realistic or generated representation of an actual or ideal showroom. For example, a specific showroom located in a city may be videoed or photographed and used for the virtual showroom display. In an embodiment, a computer-generated "flagship" showroom may be used. User 110 may use a touch screen or other common device interfaces to navigate through the showroom and select modes, models, customization, and viewing options.

Figure 2:
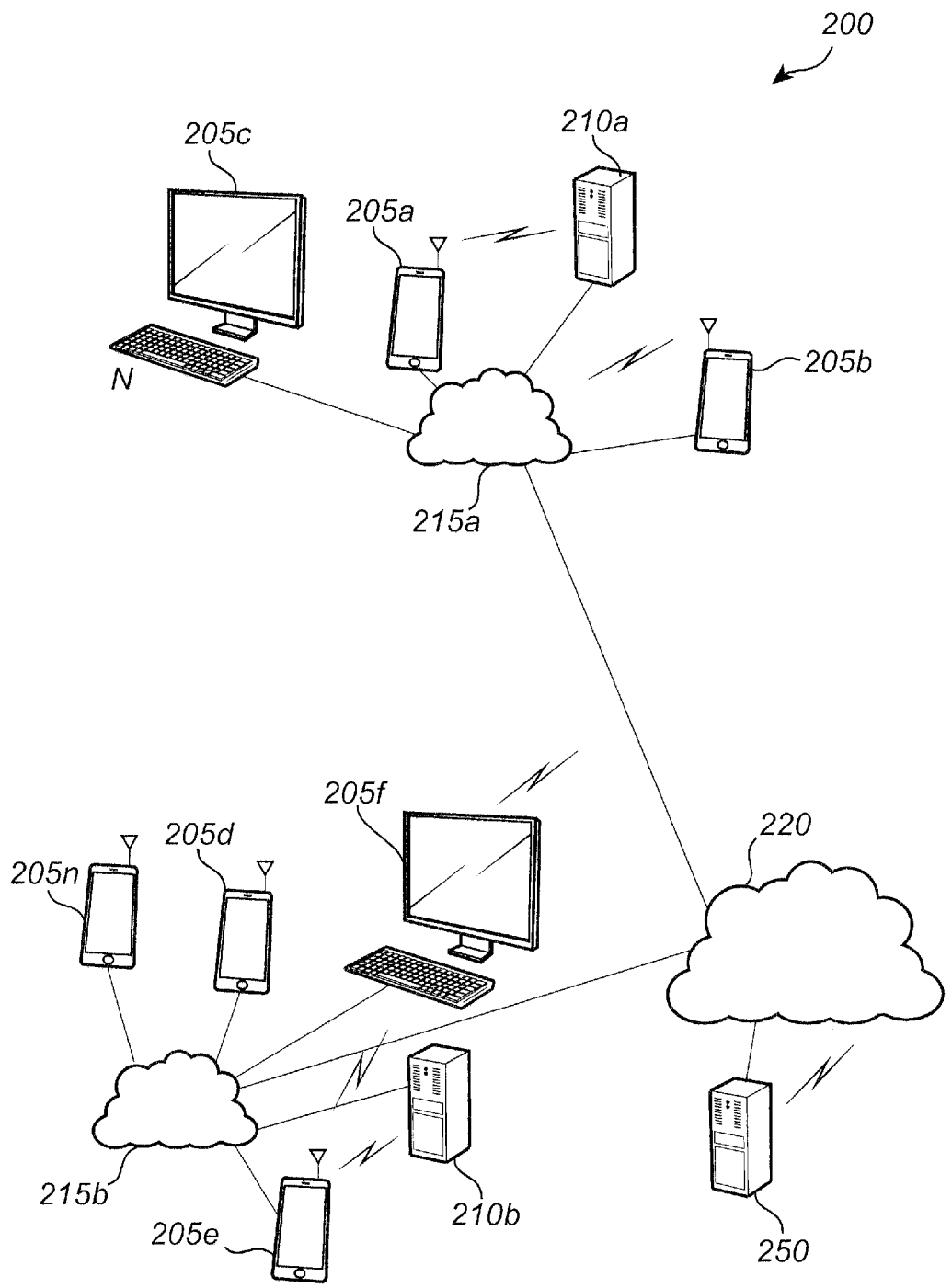
FIG. 2. illustrates an exemplary system for a virtual showroom in an embodiment.

FIG. 2 illustrates an exemplary system 200 for a virtual showroom in an embodiment. User devices such as mobile devices, tablets, smart phones, laptops, desktops, computers, PCs, terminals, etc. 205a-205n may comprise a user interface for facilitating a virtual showroom. A virtual showroom application running on devices 205a-205n (or servers 250, 210a-b) may communicate, for example, with the internet 220, LANs 210, WLAN 210, servers, cloud 220, provider servers 210 and each other. The communications may comprise information. Information, herein, may include numbers, binary numbers, bits, bytes, analog information before converted into digital form, digital data, plaintext, controls, packets, raw, processed, formatted, compressed, filtered, synchronized, sensor data, or data. Provider servers 210a and 210b may comprise a virtual showroom application, augmented reality and/or virtual showroom data and information and communicate with an application server 250 via the internet/cloud as well as the user devices 205a-205n. Two provider type networks 215a and 215b are shown, but any number of provider networks are envisioned. For example, provider server 210a may be located at a local dealership while provider server 210b may be at an exhibition out of state. The communication systems and devices the disclosed embodiments may use to be implemented are well known in the art. Networks, servers, databases, applications, users, mobiles, routers, mobile smart devices, laptops, code, PCs, WANs, LANS, security measures, communication protocols, tablets, cloud based computing, high speed networks, software code languages, wireless, and wired transmissions, are all well known in the art. Moreover, the disclosed embodiments may be implemented as a software as a service (SaaS) using any suitable platform. The disclosed embodiments may for example be offered as any suitable tiered subscription model to users. Software as a service (SaaS) architecture is well known in the art. The disclosed embodiments may also be implemented as a software application running on the local dealership severs and/or user devices. The application may be a native, hybrid, or web application. The application or SAAS may be an on-premise software application. The application may provide a user device with a complementary application. The disclosed embodiments may be able to work with and be implemented on a multiplicity of well-known platforms.

Figure 3:
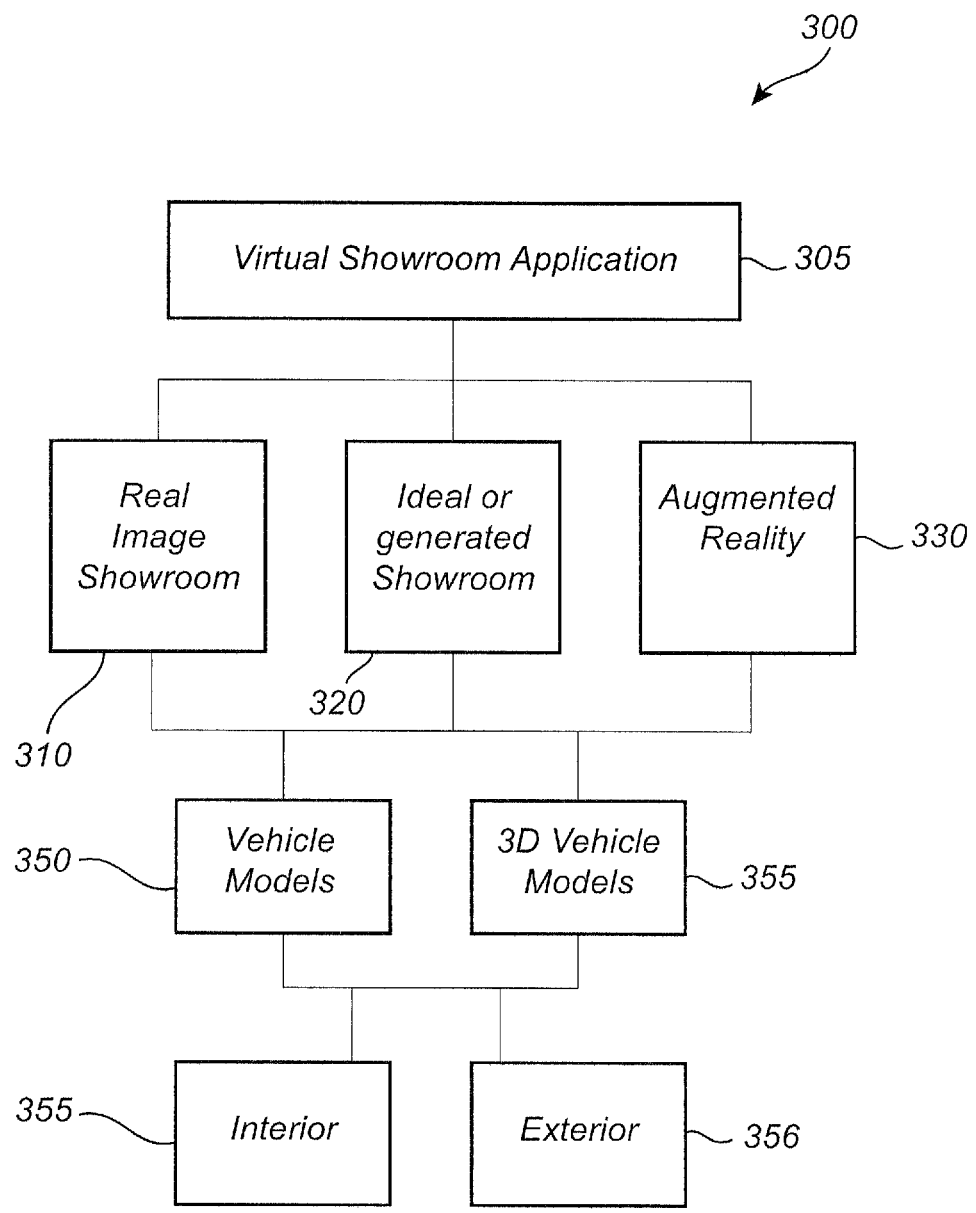
FIG. 3. illustrates a virtual showroom application in an embodiment.

FIG. 3 illustrates a virtual showroom application 300 in an embodiment. Virtual showroom application 300 may comprise the following modes or application features: a real image showroom mode 310, an ideal or generated showroom mode 320, and an augmented reality mode 330. Virtual showroom application 300 may comprise one or more of the modes. For example, ideal or generated showroom mode 320 and an augmented reality mode 330 may be available, or all three modes, only one mode, or any combinations thereof. A user may be able to switch between the modes. Each of the modes may be accessible to more than one user for a session. For example, a person may initiate a mode (session), and conference/join in a second user on another device. Thus, both users may be physically separated, and not at the showroom, but able to have the same virtual showroom experience as if they were participating by being together at a dealership. Thus, the virtual showroom significantly improves the consumer shopping/viewing experience.

The real image showroom mode 310 may use real images or images based on/generated (photos, videos, etc.) from a real showroom or dealership. In an embodiment, a collection of dealership image databases may be maintained. A user may select a showroom they are interested in. For example, they may choose to look at a showroom ten miles from their home. In an embodiment, a default showroom may be presented to a user based on their location or marketing campaigns. Images, herein, broadly may include any image media file format or protocol available. For example, an image may be a JPEG, PNG, PDF, GIF, ESP, AI, MPG, MP2, MP3, MP, MPEG, MPE, MPV, AVI, INDD, RAW, WEBM, or Mov file. An image may have been an analog image originally and then converted into a digital format. An image may have been taken with a digital camera and processed into another media format. The showroom displayed may include the outside of the dealership as well as the inside showroom. The image/s displayed may be panoramic views or partial images of the whole. The images may provide a user with a selection and sequence of views as if they were physically present at the dealership. For example, the first image presented may be the main entrance to the dealership showroom. The next image may be simulating a user standing on the other side of the entrance. In an embodiment, the sequence of images may be a guided or fixed tour. In an embodiment, the sequence of images may be interactive. The user may "walk" to the left or right and the image will change correspondingly, and so on. The images may show various vehicle models for sale at the dealership. A user may be able to browse and walk past a vehicle in the showroom to the next vehicle behind it. A user may be able to select a vehicle from the showroom vehicles models 350 to view in more detail. A user may be able to view the selected model's exterior features and options 356 or the interior features and options 355. Features 356 and 355 may be used on any mode. In an embodiment, the flow and imagery of viewing the specific vehicle images mimics a user's actual "walk" around experience. A user may select a vehicle and walk around it viewing externally, and open the door and climb in virtually and view the interior of the vehicle. In an embodiment, additional views not possible sometimes by a user at a dealership may be included in the virtual showroom. For example, the user may be able to view the roof (looking down bird's eye view), of which may not be physically possible at a real showroom. Another example may be for a user to see the perspectives of child passengers (what they may see) in a vehicle seat. A user may be able to change/toggle the color of the model/s shown or change the options shown, thus, comparing a model/features spatially and temporally in a manner that may not be possible at a real showroom. Thus, the virtual showroom significantly improves the consumer shopping/viewing experience. Further, given a price point or desired delivery date, the virtual showroom may be configured to display a vehicle with the suitable options available, given inventory, etc.

Ideal or generated showroom mode 320 may be an ideal representation of a showroom including models and number of vehicles not necessarily in a real showroom. The ideal showroom may be computer generated. It may be generated in part utilizing artificial intelligence (AI). It may be generated by a vehicle manufacture as their ideal flagship showroom. The ideal or generated showroom may be able to virtually "house" more vehicles than a typical showroom, because typical showrooms are limited in physical space. In an embodiment, concept vehicles maybe displayed in the ideal or generated virtual showroom. Again, this feature may allow a user to experience a vehicle that may not be available to view at an actual dealership. Customization of views may also be available in the generated showroom mode. For example, a consumer may select an option that only SUVs are shown in the showroom. A consumer may be able to select an option to go back to the default view. A consumer may select an option that the showroom lines up models in a row for comparison. Many different views and configurations of displaying the models may be possible in the generated showroom. Thus, providing consumers with showroom options and experiences not possible in real life. Thus, the virtual showroom significantly improves the consumer viewing and shopping experience.

Augmented reality mode 330 may utilize a user's device camera features in order to obtain augmented reality information. For example, a user may hold up their smart phone and capture a vehicle model on their screen (via user device camera features). Augmented reality information may then be presented (overlaid) on the vehicle image. In an embodiment, a user may use this mode at a dealership only. In an embodiment, a user may use the mode anywhere their mobile device has communication services. For example, a user may be at a grocery store parking lot and notice a vehicle they think is cool. They may use the augmented reality mode and point their smart phone at the vehicle to receive augmented reality information about that vehicle. In an embodiment, if a user doesn't see the model of vehicle they want to receive augmented information on, the mode may comprise a 3D model feature 355, The 3D model feature 355 may allow the user to select a virtual model and "drop" it into the image as if it was there and receive augmented reality information on it. The 3D model feature 355 may be used for any of the disclosed modes. In an embodiment, augmented reality mode may comprise an automatic information 360 feature. For example, when a user enters the mode, augmented reality information may be automatically pushed to the display. The user may simply scan their environment and view augmented information as it may pop-up for the captured images. In an embodiment, the user may select an on/off 362 (toggle) augmented information displaying feature. For example, a user points their camera at a vehicle, and toggles an on/off mode for the augmented information, such that, the user decides when to receive the augmented information. A user may be able to switch between modes. For example, a user may be using ideal or generated showroom mode 320 at a dealership, and walk outside and switch to augmented reality mode 330.

FIG. 4 illustrates vehicle information 400 provided in an embodiment. In any mode the user may desire to know or receive specific information regarding a vehicle. A car manufacturer or dealer may desire consumers to know of certain vehicle features. The vehicle information provided for augmented reality information or for virtual showroom overlays may broadly encompass two main categories: exterior 405 and interior vehicle features 410. Interior features, options, and information may include, for example, seat material, seat style, color, trim, audio, airbag safety information, blind spot detection, lane departure, and environmental controls. Exterior features, options, information may include, for example, wheel styles, wheel size, colors, trim, braking safety, transmission, vehicle turning capacity, hood, safety cage, sudden stop, and headlight information. In an embodiment, a user may request vehicle information not presented. Vehicle information 400 may be provided in a variety of formats. Vehicle information 400 is a subset of information. Vehicle information may be a text box, video, photo, composite images, image with text overlaid, sound, augmented reality overlays, or any combinations thereof. For example, a video or demo of how lane departure works or how an air bag deploys may be presented. A consumer may view images of interior trim options. A text box may describe how much horsepower an engine has.

Figure 5A:
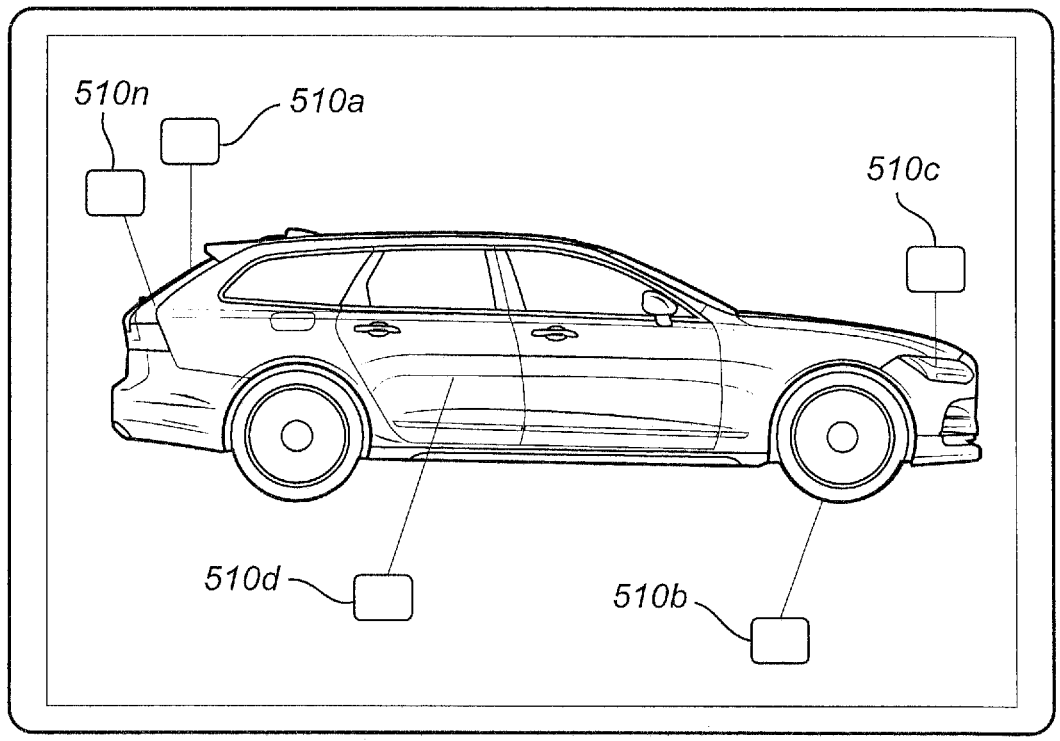
FIG. 5A. illustrates displaying of vehicle information in an embodiment.
Figure 5B:
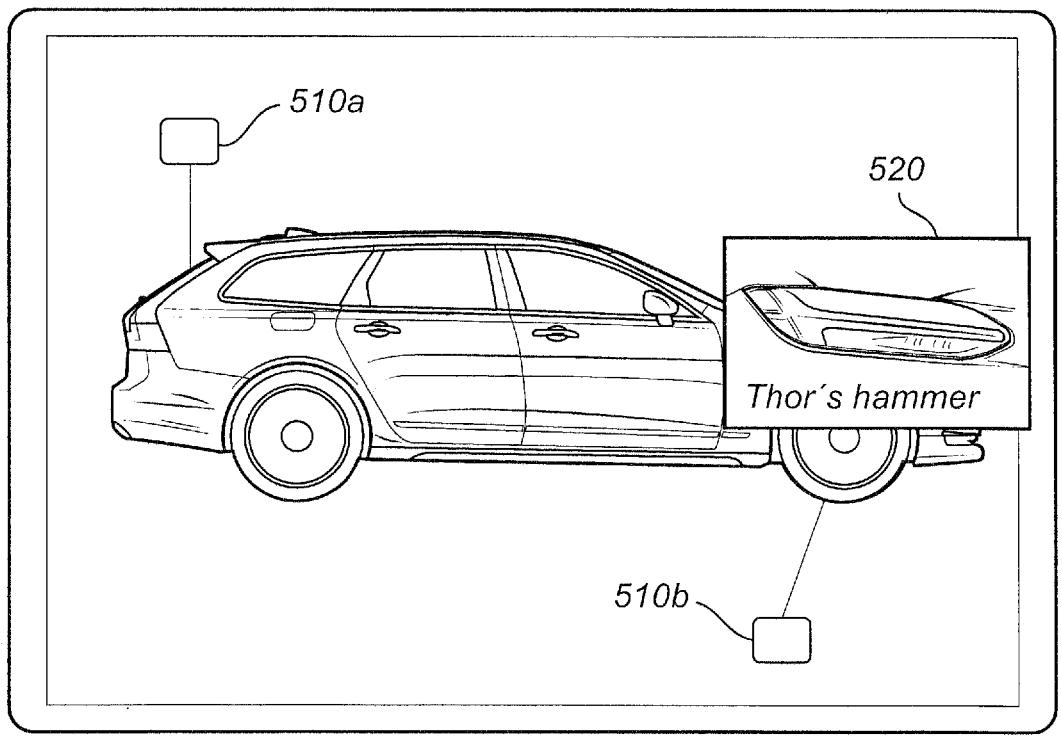
FIG. 5B. illustrates displaying of vehicle information in an embodiment.
Figure 5C:
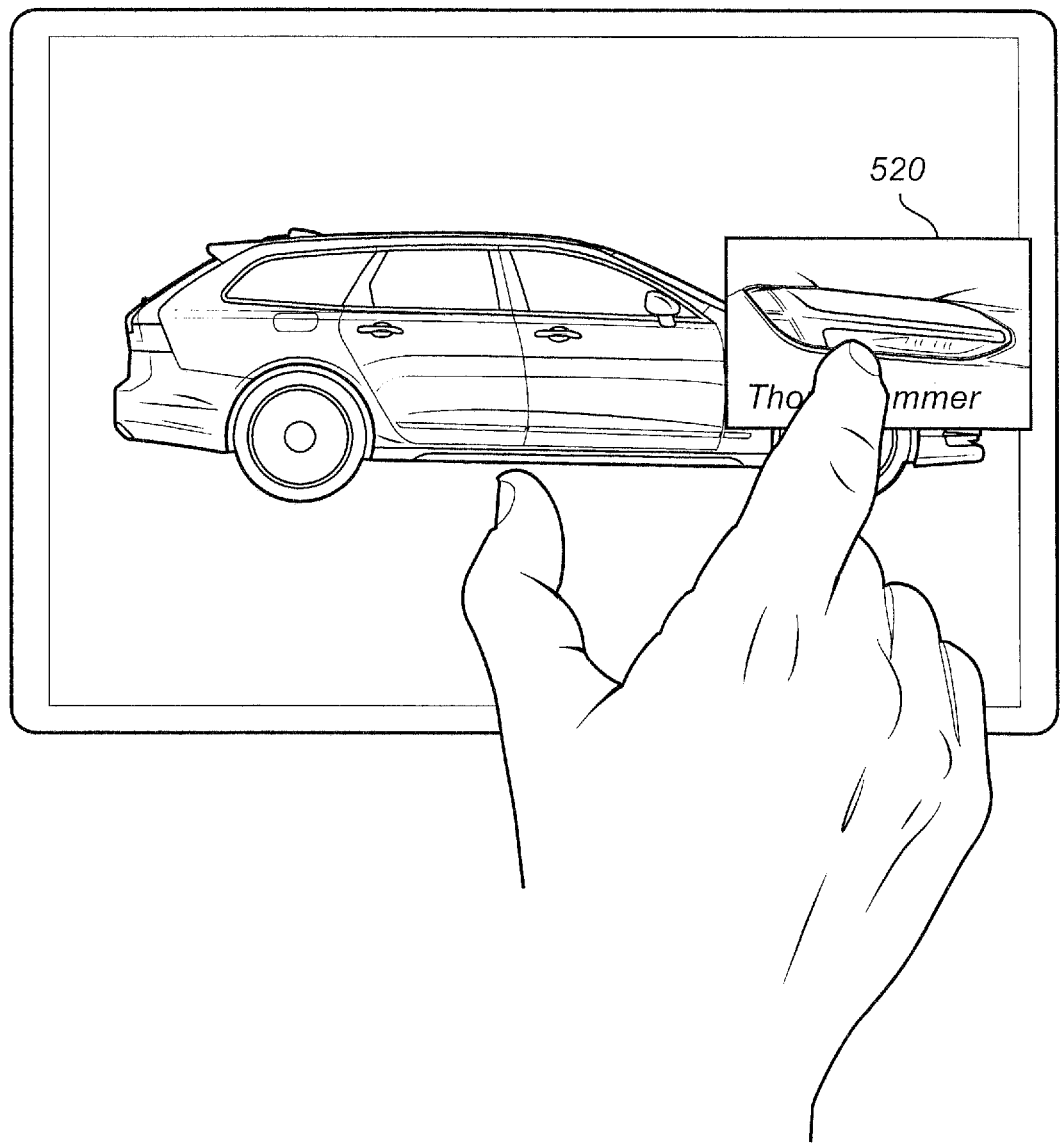
FIG. 5C. illustrates displaying of vehicle information in an embodiment.

FIG. 5A-C illustrates displaying 500 of vehicle information in an embodiment. Vehicle information 400 may be presented in a variety of manners. In an embodiment, the items where vehicle information 400 are available are presented on image/s as annotations 510a-n (e.g. symbols, numbers, notes, icons, footnotes, small pop-up window) that indicate content or information is available. For example, annotation 510a may be exterior color, 510b may be wheels, 510c may be headlights, 510d may be trim, and 510n may be signal lights. The annotations may themselves be categorized to aide viewing. For example, all of the vehicle design annotations may be a certain color while all of the safety annotations are a symbol. A user may select an annotation in order to receive more detailed information. For example, annotation 510c regarding headlights may be selected. In an embodiment, as shown in FIG. 5B, the annotation 510c was selected and a 520 was presented showing more detailed information about the headlights. The detailed information may be presented in a variety of manners. For example, as text, image, video, sound clip, or any combinations thereof. For example, 520 may pop up a video that has a spoke person explaining "Thor's hammer" style LED headlights. Or a photo of the headlight with text overlay may be popped up. In an embodiment, as shown in FIG. 5C, the user may touch or scan across a vehicle part or area and that will pop up an annotation. The user can then further indicate (e.g. double click/tap) that they want more detailed information 520. In an embodiment, a user may touch or scan across a vehicle part or area and that will pop up detailed information 520 without seeing an annotation first. In an embodiment, a user may select what types of annotations to receive. For example, the user may select (e.g. settings, list, or app menu, customization), that they are only interested in receiving annotations regarding design features such as trim and colors. Thus, only annotations 510a and 510d may be presented. Thus, consumers showroom experience is significantly improved. In real life, a consumer can't remove stickers or decide what and how vehicle information will be presented to them.

Figure 6:
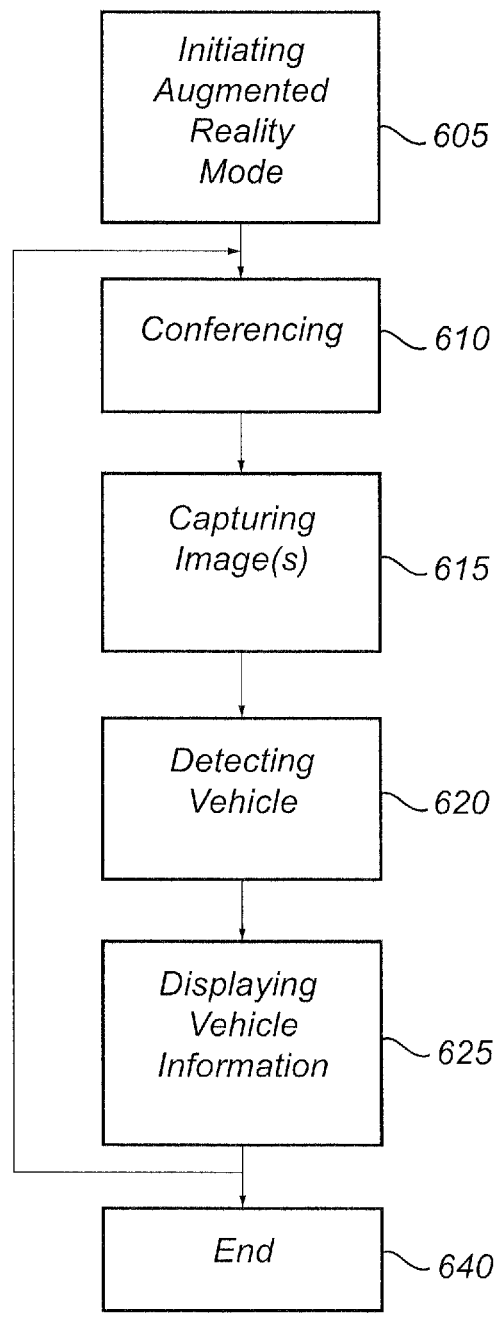
FIG. 6. illustrates a method for augmented reality in an embodiment.

FIG. 6 illustrates a method 600 for augmented reality in an embodiment. At step 605, initiating augmented reality mode. The mode may be initiated in a variety of manners. For example, a user may select the augmented reality mode from an application menu, list, user interface, opening an application (automatic), as is well known in the art. User device 205a-n may be used for providing a user interface and display. At step 610, optionally, sharing the session by conferencing in a third party. For example, a second user device may share the first device's screen via well-known screen sharing (or online conferencing) techniques such as a custom-encoded video stream. At step 615, capturing image/s. The user device may use the camera features on their device to capture image/s. In an embodiment, the user may select a 3D image that was predetermined by the dealer/manufacture in lieu of capturing an image/s. At step 620, detecting vehicle. The vehicle may be detected using image recognition. Image processing may be done on the user device 205a-n or on a server 210a-b or 250 such as shown in FIG. 2. At step 625 displaying vehicle information. The presentation of the information may be presented in a variety of manners as discussed, for example, in FIG. 5A-C. The information may be supplied via a server 210a-b or 250 such as shown in FIG. 2. The process may then repeat itself and proceed to step 615, or the process may end at step 640. For example, the user may reposition their camera onto another vehicle and the process starts again for the new vehicle.

Figure 7:
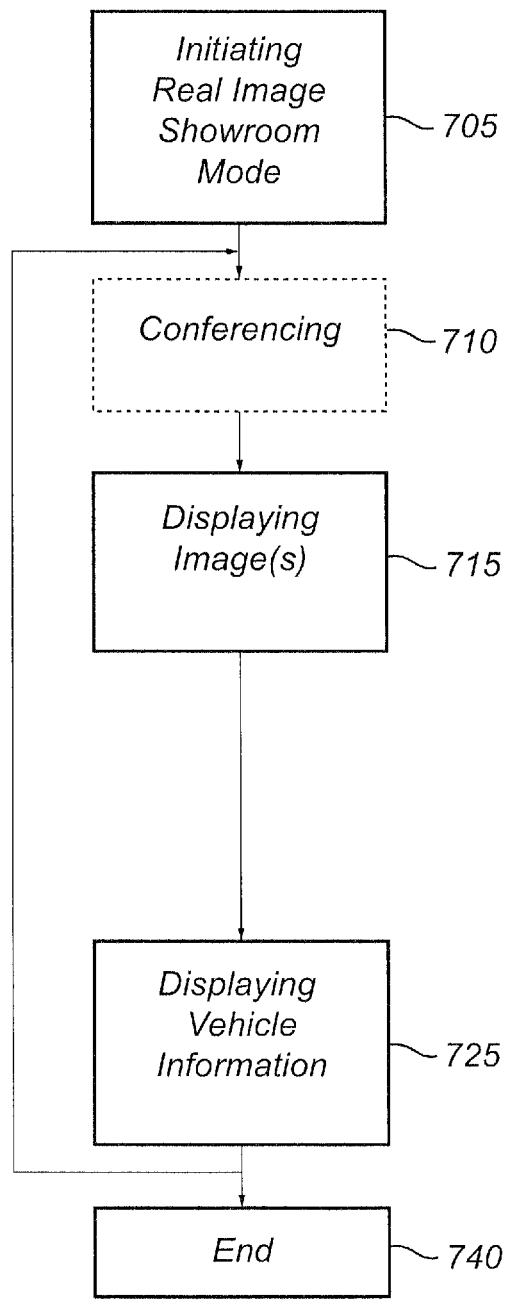
FIG. 7. illustrates a method for real image showroom in an embodiment.

FIG. 7 illustrates a method 700 for real image showroom—in an embodiment. At step 705, initiating real image showroom mode. The mode may be initiated in a variety of manners. For example, a user may select the real image showroom mode from an application menu, list, user interface, opening an application (automatic), as is well known in the art. A user may select which showroom to view, or it may be automatically presented to them. User device 205a-n may be used for providing a user interface and display. At step 710, optionally, sharing the session by conferencing in a third party. For example, a second user device may share the first device's screen via well-known screen sharing (or online conferencing) techniques such as a custom-encoded video stream. At step 715, displaying predetermined image/s. A provider may have a collection of stored images associated with dealerships. The information may be supplied via a server 210a-b or 250 such as shown in FIG. 2. At step 725, displaying vehicle information. The presentation of the information may be presented in a variety of manners as discussed, for example, in FIG. 5A-C. The information may be supplied via a server 210a-b or 250 such as shown in FIG. 2. The process may then repeat itself and proceed to step 715, or the process may end at step 740. For example, a user may "walk" around the virtual showroom and new image/s will be displayed.

Figure 8:
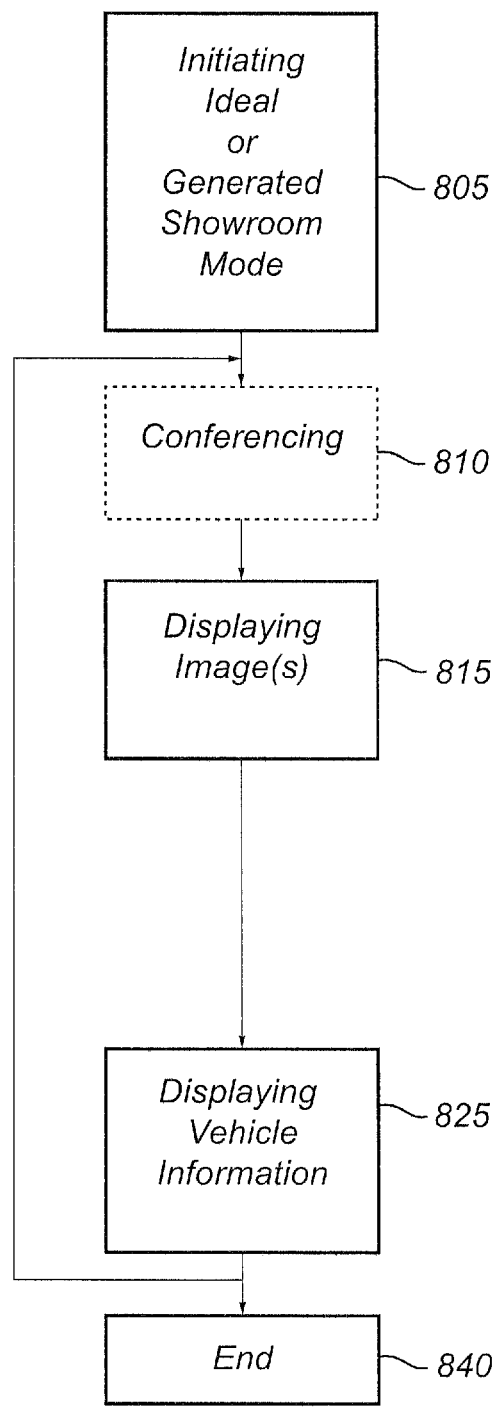
FIG. 8. illustrates a method for ideal or generated image showroom in an embodiment.

FIG. 8 illustrates a method 800 for ideal or generated image showroom in an embodiment. At step 805, initiating ideal or generated image showroom mode. The mode may be initiated in a variety of manners. For example, a user may select the ideal or generated image showroom from an application menu, list, user interface, opening an application (automatic), as is well known in the art. A user may select which showroom to view, or it may be automatically presented to them. User device 205a-n may be used for providing a user interface and display. At step 810, optionally, sharing the session by conferencing in a third party. For example, a second user device may share the first device's screen via well-known screen sharing (or online conferencing) techniques such as a custom-encoded video stream. At step 815, displaying predetermined image/s. At step 825 displaying vehicle information. The presentation of the information may be presented in a variety of manners as discussed, for example, in FIG. 5A-C. The information may be supplied via a server 210a-b or 250 such as shown in FIG. 2. The process may then repeat itself and proceed to step 815, or the process may end at step 840. For example, a user may "walk" around the virtual showroom and new image/s will be displayed.

Figure 9:
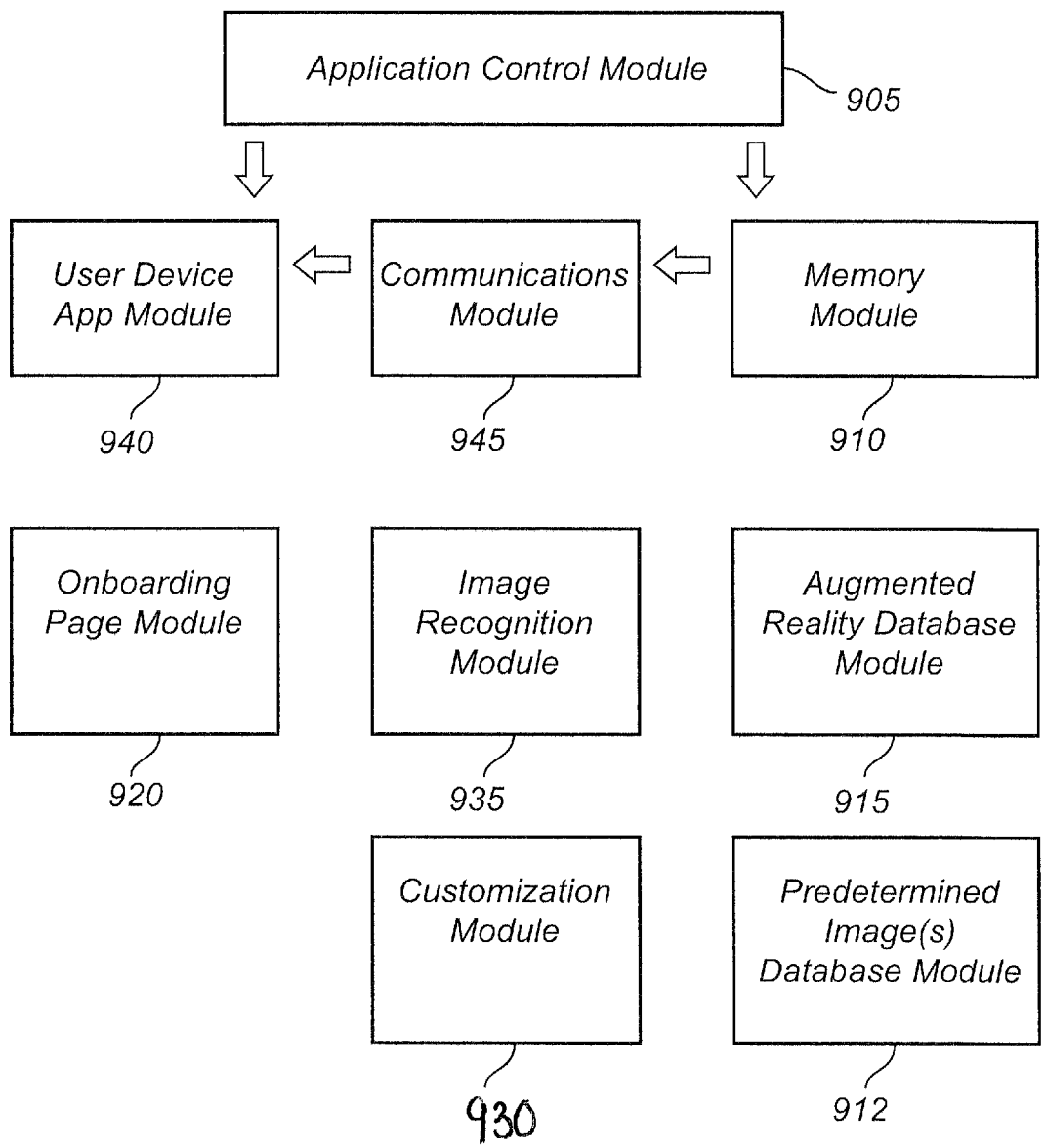
FIG. 9. illustrates an application for virtual showroom in an embodiment.

FIG. 9 illustrates an application 900 for virtual showroom in an embodiment. The application 900 may comprise various modules for information gathering, information sharing, controlling, and processing in order to facilitate a virtual showroom. A general direction of data flow is shown by the arrows in FIG. 9, but it is well understood that information may flow differently (e.g. bi-directional) between the modules. The application 900 may comprise an application control module 905 used for processing and controlling the various user applications, user interfaces, modules, inputs, outputs, storage, information flow, communications, displays, dashboards, customizations, and analytics. The application control module may utilize at least one processor.

The application 900 may comprise a memory module 910, predetermined image database module 912, and augmented reality database 915 used for gathering, retrieving, and storing information. Memory module 910, predetermined image database module 912, and augmented reality database 915 may search, gather, consolidate, and store relevant information. Database or memory information may be normalized, separated based on file formats or content for the disclose embodiments. Moreover, the information the modules may use, may be simply extracted from other databases. Memory module may utilize well-known memory storage technologies, for example, ROM, RAM, Disks, and Flash.

Application 900 may comprise a user application/device module 940. Information sent to and from the user devices may be controlled with this module. In an embodiment, the user may log into a cloud-based server. The user interface (UI) may be primarily supplied on the remote server (e.g. streaming UI). In an embodiment, the user interface may be primarily installed on the user device. Application 900 may comprise an onboarding page (e.g. launching page) module 920. The onboarding page module may be part of the user device application module 940, or it may be a separate module. The onboarding page module may reside and/or may be displayed on end user devices. For example, a user may login to the application 900 using a smartphone or a PC. The onboarding page 920 contents may comprise a user interface that helps display data in a manner that is easier to view and make sense of for the end users. Onboarding pages may be customized for providers or users using customization module 930. The onboarding page content display may be customized differently for different end users. For example, a consumer may want to see all annotations while another consumer may want to limit the visible annotations to safety features only. The onboarding page module 920 may decide what showroom is presented to a user on startup.

Application 900 may compromise a customization module 930. Customization module 930 may allow for manual and automatic customization on both the server and user device sides. Customization module 930 may, for example, allow for automatic language selection, customize the information that is allowed to be shared per dealership, user settings or preferences and such.

Application 900 may compromise an image recognition module 935. The image recognition module may help determine what vehicle is captured in an image. The image recognition module 935 may use well-known image recognition techniques. In an embodiment, the image recognition module 935 may use AI.

Application 900 may compromise a communications module 945. The communications module may control and be configured to transmit and receive information to the servers, cloud, and devices as shown for example in FIG. 2 and FIG. 10.

Figure 10:
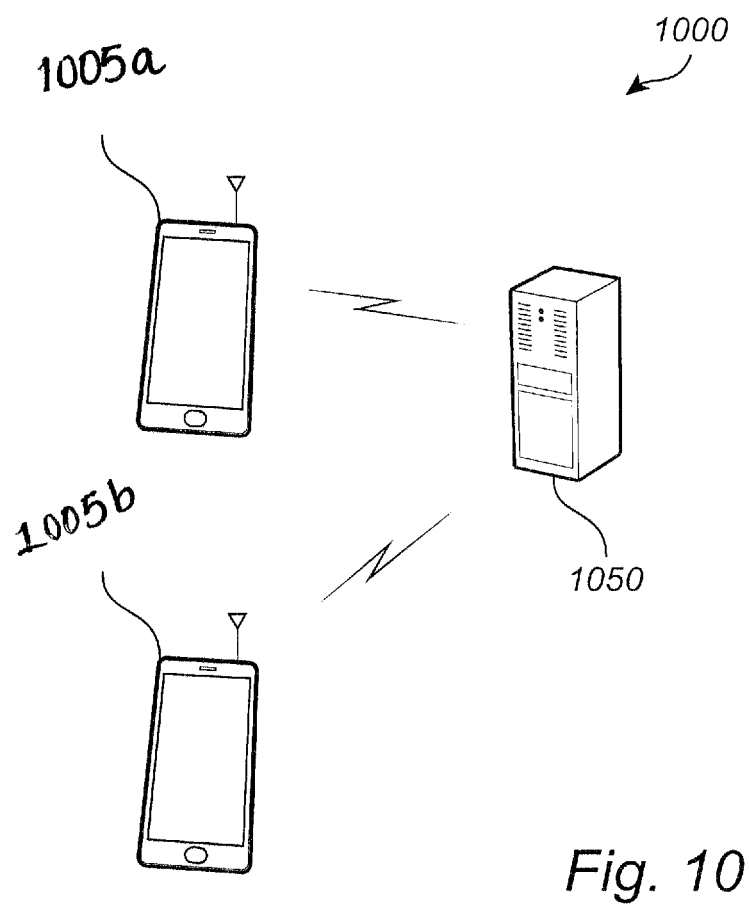
FIG. 10. illustrates a system for virtual showroom in an embodiment.

FIG. 10 illustrates a system 1000 for virtual showroom in an embodiment. Server 1050 may be configured to communicate wirelessly or wired with user devices 1005*a* and 1005*b*. User devices may be configured to communicate wirelessly or wired with each other and server 1050. Two user devices and one server are shown for simplicity, but any number of servers and devices may be used (FIG. 2). In an embodiment, user device 1005*a* may be in communication with server 1050 and conferencing in user device 1005*b*. In an embodiment, user device 1005*a* may be independently communicating with server 1050 and user device 1005*b* may be independently communicating with server 1050. User devices 1005*a-b* and server 1050 may perform any of the steps as discussed in the embodiments, for example, the steps shown in FIGS. 6, 7, 8, and 11-13. User devices 1005*a-b* and server 1050 may comprise any of the modules and applications as discussed in the embodiments.

Figure 11:
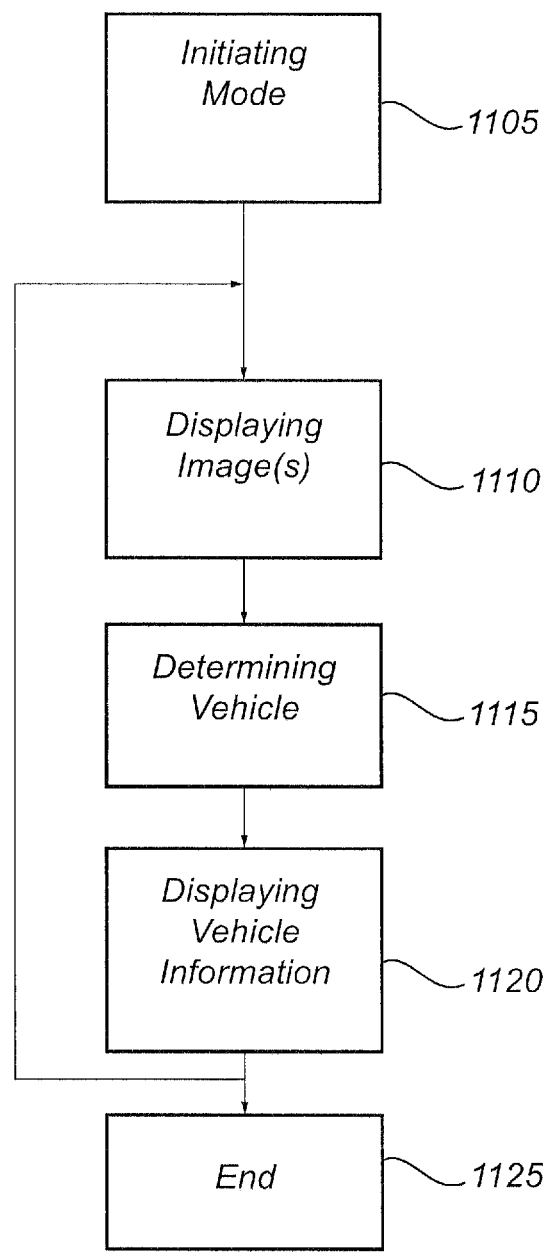
FIG. 11. illustrates a method for virtual showroom in an embodiment.

FIG. 11 illustrates a method 1100 for virtual showroom in an embodiment. At step 1105, initiating a virtual showroom mode. As discussed in the embodiments, the mode may be automatically selected or initiated, or a user may select and initiate the mode. A server may select and initiate a mode. There may be one, two, or three modes available. At step 1110, displaying at least one virtual showroom image. As discussed in the embodiments, the images may be real, generated, or captured, and in a variety of formats. At step 1115, determining a vehicle. Determining a vehicle may include detecting the vehicle utilizing image recognition, determining a vehicle based on the virtual tour, determining it based on user selection, or predetermined. In an embodiment, an indication of a determined vehicle may be transmitted. The indication may be an image for the image recognition to process. The indication may be a specific model number. At step, 1120 displaying vehicle information. As discussed in the embodiments, there are many different ways the vehicle information may be displayed. The process may repeat at 1110 or end at 1125. The steps 1105-1125 may be performed in whole or in part on either server or user devices depending on the platforms and UIs implemented.

Figure 12:
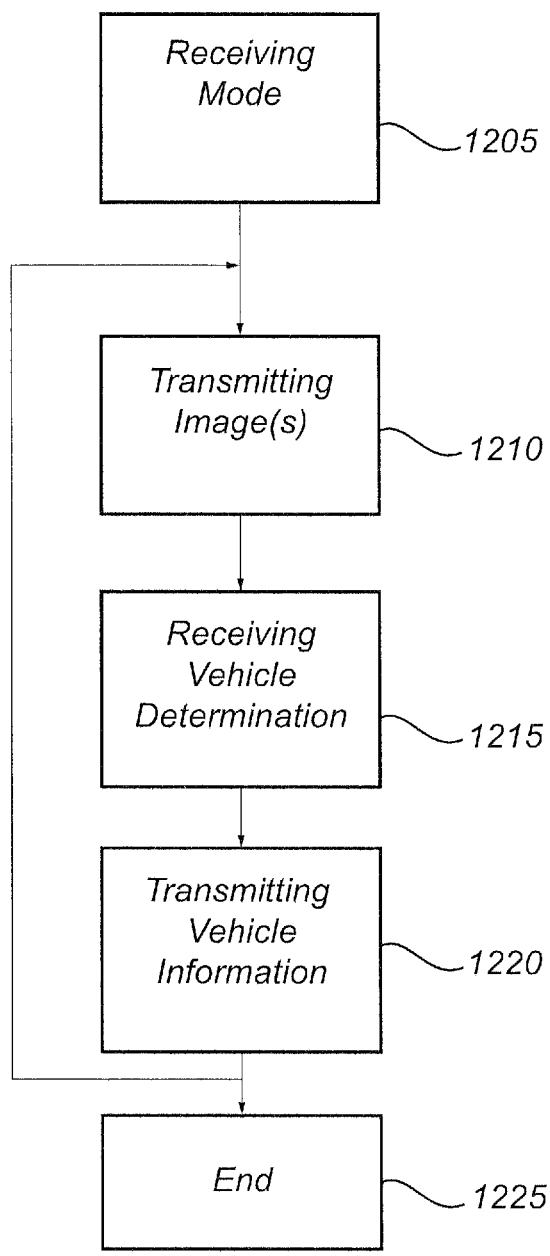
FIG. 12. illustrates a method for virtual showroom in an embodiment.

FIG. 12 illustrates a method 1200 for virtual showroom in an embodiment. At step 1205, receiving a virtual showroom mode. The mode may be received between user devices and servers, or it may be received on a device or server between its modules. For example, a server may transmit the indication of a mode between its modules. A user may select a mode on their device and the mode selection indicated may be transmitted to a server. At step 1210, transmitting at least one virtual showroom image. The transmitted image/s may be between user devices and servers, or it may be received on a device or server between its modules. For example, a user device may capture an image and transmit it between modules or between devices. For example, a server may transmit an image to a user device. At step 1215, receiving vehicle determination. The received vehicle determination may be received between user devices and servers, or it may be received on a device or server between its modules. In an embodiment, an indication of a determined vehicle may be received. The indication may be an image for the image recognition to process. The indication may be a specific model number. At step, 1220 transmitting vehicle information. The process may repeat at 1210 or end at 1225. The steps 1105-1125 may be performed in whole or in part on either server or user devices depending on the platforms and UIs implemented.

FIG. 13 illustrates code 1300 for virtual showroom in an embodiment. At 1305, code to select a showroom mode. At 1310, code to transmit the selected mode. At 1315, code to receive a showroom mode selected. At 1320, code to transmit showroom images based on the received showroom mode. At 1325, code to display showroom images. At 1330, code to determine a vehicle selected. At 1335, code to transmit the vehicle selection. At 1340, code to receive a vehicle selection. At 1345, code to transmit vehicle information based on the received vehicle selection. At 1350, code to display the vehicle information.

In other embodiments, the processing modules may be implemented using a shared processing device, individual processing devices, or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The described embodiments or any part(s) or function(s) thereof, may be implemented using hardware, software, or a combination thereof, and may be implemented in one or more computer systems or other processing systems. A computer system for performing the operations of the described embodiments and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the embodiments using other computer systems and/or architectures.

The foregoing description of the preferred embodiments has been presented for purposes of illustration and description. It is not intended to be exhaustive or to limit the embodiments to the precise form or to exemplary embodiments disclosed. Obviously, many modifications and variations will be apparent to practitioners skilled in this art. Similarly, any process steps described might be interchangeable with other steps in order to achieve the same result. The embodiments were chosen and described in order to best explain the principles of the embodiments and its best mode practical application, thereby to enable others skilled in the art to understand the various embodiments and with various modifications as are suited to the particular use or implementation contemplated. It is intended that the scope of the embodiments be defined by the claims appended hereto and their equivalents. Reference to an element in the singular is not intended to mean "one and only one" unless explicitly so stated, but rather means "one or more." Moreover, no element, component, nor method step in the described disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

In addition, the conjunction "and" when used in the claims is meant to be interpreted as follows: "X, Y and Z" means it can be either X, Y or Z individually, or it can be both X and Y together, both X and Z together, both Y and Z together, or all of X, Y, and Z together.

It should be understood that the figures illustrated in the attachments, which highlight the functionality and advantages of the described embodiments, are presented for example purposes only. The architecture of the described embodiments are sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the described embodiments in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. A process or method may be implemented with a processor, or similar device, or any combination of hardware and software.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices. Moreover, a microprocessor, or similar device may have internal or external memory associated with it.

The various features of the embodiments described herein can be implemented in different systems without departing from the embodiments. It should be noted that the foregoing embodiments are merely examples and are not to be construed as limiting the embodiments. The description of the embodiments is intended to be illustrative, and not to limit the scope of the claims. As such, the described teachings can be readily applied to other types of apparatuses and many alternatives, modifications, and variations will be apparent to those skilled in the art.

What is claimed is:

1. A computer implemented method for a virtual showroom, comprising:
    receiving a virtual showroom mode indication;
    transmitting at least one virtual showroom image based on the received virtual showroom mode indication;
    receiving an indication of a determined vehicle of a plurality of vehicles arranged in the virtual showroom image related to which vehicle information is desired, wherein a user may alter a feature configuration of a virtual representation of the determined vehicle in the at least one virtual showroom image, move freely about an exterior of the virtual representation of the determined vehicle in the at least one virtual showroom image, enter an interior of the virtual representation of the determined vehicle in the at least one virtual showroom image, and select a seating perspective within the interior of the virtual representation of the determined vehicle in the at least one virtual showroom image; and
    transmitting the vehicle information based on the indication of the determined vehicle.

2. The computer implemented method of claim 1, wherein the mode indicated is one of a real image showroom, generated showroom, and augmented reality mode.

3. The computer implemented method of claim 1, wherein the indication of the determined vehicle is an image for image recognition.

4. The computer implemented method of claim 1, wherein the indication of the determined vehicle is a model number.

5. The computer implemented method of claim 1, wherein the at least one virtual showroom image transmitted is one of a real showroom image, a generated showroom image, and a captured image.

6. The computer implemented method of claim 5, wherein the at least one virtual showroom image comprises an interactive predetermined sequence of images.

7. The computer implemented method of claim 5, wherein the at least one virtual showroom image comprises a tour of predetermined sequence images.

8. The computer implemented method of claim 1, wherein the vehicle information transmitted comprises text, video, photo, and composites.

9. The computer implemented method of claim 1, wherein the vehicle information transmitted comprises annotations.

10. The computer implemented method of claim 1, wherein the vehicle information transmitted comprises detailed vehicle information.

11. A system for virtual showroom, comprising:
a server, the server comprising at least one processor and a memory, the memory coupled to the at least one processor, the server capable of communicating with a user device, the memory comprising stored instructions which when executed by the at least one processor perform:
receiving from the user device a virtual showroom mode;
transmitting to the user device at least one virtual showroom image based on the received virtual showroom mode;
receiving from the user device a vehicle identification of a determined vehicle of a plurality of vehicles arranged in the virtual showroom image related to which vehicle information is desired, wherein a user may alter a feature configuration of a virtual representation of the determined vehicle in the at least one virtual showroom image, move freely about an exterior of the virtual representation of the determined vehicle in the at least one virtual showroom image, enter an interior of the virtual representation of the determined vehicle in the at least one virtual showroom image, and select a seating perspective within the interior of the virtual representation of the determined vehicle in the at least one virtual showroom image; and
transmitting to the user device the vehicle information based on the vehicle identification.

12. The system of claim 11, wherein the at least one virtual showroom image comprises an interactive predetermined sequence of images.

13. The system of claim 11, wherein the vehicle identification is an image for image recognition.

14. The system of claim 11, further comprising:
conferencing in a second user device.

15. The system of claim 11, wherein the at least one virtual showroom image transmitted is one of a real showroom image, a generated showroom image, and a captured image.

16. The system of claim 11, wherein the vehicle information transmitted comprises annotations.

17. A non-transitory computer readable medium encoded with processing instructions, for virtual showroom, comprising:
code to receive a showroom mode;
code to transmit showroom images based on the received showroom mode;
code to receive a vehicle selection of a determined vehicle of a plurality of vehicles arranged in the showroom images related to which vehicle information is desired, wherein a user may alter a feature configuration of a virtual representation of the determined vehicle in the at least one virtual showroom image, move freely about an exterior of the virtual representation of the determined vehicle in the at least one virtual showroom image, enter an interior of the virtual representation of the determined vehicle in the at least one virtual showroom image, and select a seating perspective within the interior of the virtual representation of the determined vehicle in the at least one virtual showroom image; and
code to transmit the vehicle information based on the received vehicle selection.

18. The non-transitory computer readable medium of claim 17, wherein the mode is one of a real image showroom, generated showroom, and augmented reality mode.

19. The non-transitory computer readable medium of claim 17, wherein the vehicle information transmitted comprises annotations and detailed vehicle information.

20. The non-transitory computer readable medium of claim 17, wherein the vehicle information transmitted comprises one of text, video, annotation, photo, and composites.

* * * * *